United States Patent
Anglin et al.

(10) Patent No.: US 11,210,751 B2
(45) Date of Patent: Dec. 28, 2021

(54) TARGETING ENERGY UNITS IN A BLOCKCHAIN

(71) Applicant: International Business Machines Corporation, Armonk, NY (US)

(72) Inventors: Howard N. Anglin, Leander, TX (US); Su Liu, Austin, TX (US); Fehmina Merchant, Irvine, CA (US); Leucir Marin, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 16/741,783

(22) Filed: Jan. 14, 2020

(65) Prior Publication Data

US 2021/0217110 A1    Jul. 15, 2021

(51) Int. Cl.
| | |
|---|---|
| *G06Q 50/06* | (2012.01) |
| *H02J 13/00* | (2006.01) |
| *G05F 1/66* | (2006.01) |

(52) U.S. Cl.
CPC ........ *G06Q 50/06* (2013.01); *H02J 13/00002* (2020.01); *H02J 13/00007* (2020.01); *G05F 1/66* (2013.01)

(58) Field of Classification Search
CPC ................ G06Q 50/06; H02J 13/00002; H02J 13/00007; G05F 1/66
See application file for complete search history.

(56) References Cited

U.S. PATENT DOCUMENTS

| | | | |
|---|---|---|---|
| 9,274,540 B2* | 3/2016 | Anglin | G06Q 10/0631 |
| 9,429,974 B2* | 8/2016 | Forbes, Jr. | H02J 13/0013 |
| 9,718,371 B2 | 8/2017 | Anglin et al. | |
| 9,967,334 B2 | 5/2018 | Ford | |
| 10,936,302 B2* | 3/2021 | Eklund | H04W 12/35 |
| 10,946,762 B2* | 3/2021 | Gupta | G06Q 30/0283 |
| 10,983,781 B2* | 4/2021 | Cecchetti | H04L 9/0891 |
| 2012/0029720 A1* | 2/2012 | Cherian | H02J 13/0086 700/297 |

(Continued)

FOREIGN PATENT DOCUMENTS

| | | |
|---|---|---|
| AU | 2018100340 A4 | 5/2018 |
| CN | 103562001 B | 5/2016 |

(Continued)

OTHER PUBLICATIONS

Miglani et al., "Blockchain for Internet of Energy management: Review, solutions, and challenges", Jan. 11, 2020, © 2020 Elsevier B.V., 24 pages.

(Continued)

*Primary Examiner* — Ramesh B Patel
(74) *Attorney, Agent, or Firm* — Stephen R. Yoder

(57) ABSTRACT

A method and system for tracking and targeting particular energy sources in an electrical grid is provided. A processor stores information regarding units of produced energy as transactions in a blockchain. A processor receives, from an endpoint device of a plurality of endpoint devices connected to a power grid, a request for a unit of energy represented in the blockchain. A processor sends an indication, to the endpoint device, that the endpoint device is permitted to consume the unit of energy from the power grid. A processor updates the blockchain to record the consumption of the unit of energy.

21 Claims, 7 Drawing Sheets

(56) References Cited

U.S. PATENT DOCUMENTS

| | | | |
|---|---|---|---|
| 2013/0006677 A1* | 1/2013 | Anglin | B60L 55/00 705/5 |
| 2017/0083989 A1* | 3/2017 | Brockman | G06Q 50/06 |
| 2017/0103468 A1* | 4/2017 | Orsini | G07F 15/003 |
| 2017/0358041 A1* | 12/2017 | Forbes, Jr | G06Q 10/00 |
| 2018/0262011 A1* | 9/2018 | Itaya | H02J 3/383 |
| 2018/0285217 A1* | 10/2018 | Smith | G06F 21/00 |
| 2018/0299852 A1* | 10/2018 | Orsini | G05B 19/042 |
| 2019/0012249 A1* | 1/2019 | Mercuri | G06Q 20/308 |
| 2019/0033385 A1 | 1/2019 | Karner et al. | |
| 2019/0050949 A1* | 2/2019 | Orsini | G06Q 50/06 |
| 2019/0123580 A1* | 4/2019 | Bindea | G05B 13/026 |
| 2019/0164236 A1* | 5/2019 | Mayne | G06Q 20/389 |

FOREIGN PATENT DOCUMENTS

| | | |
|---|---|---|
| CN | 108011370 A | 5/2018 |
| CN | 108765100 A | 11/2018 |
| CN | 109990385 A | 7/2019 |
| EP | 2627532 B1 | 3/2015 |
| WO | 2019141511 A1 | 7/2019 |

OTHER PUBLICATIONS

Patent Cooperation Treaty PCT, "Notification of Transmittal of The International Search Report and The Written Opinion of The International Searching Authority, or The Declaration", Applicant's file reference, International application No. PCT/EP2020/086629, International filing date Dec. 17, 2020, dated Mar. 31, 2021, 10 pages.

IBM, "Secure Payments "On The Go" With Blockchain Technology From ZF, UBS and IBM", IBM News Room, Sep. 12, 2017, 3 pages, <https://www-03.ibm.com/press/us/en/pressrelease/53122.wss>.

Andoni, et al., "Blockchain technology in the energy sector: A systematic review of challenges and opportunities", Renewable and Sustainable Energy Reviews, Oct. 8, 2018, 32 pages.

Chitchyan et al., "Review of Blockchain Technology and its Expectations: Case of the Energy Sector", arXiv:1803.03567v1 [cs.CY] Mar. 9, 2018, 11 pages.

Ellsmoor, J., "Meet 5 Companies Spearheading Blockchain For Renewable Energy", Forbes, Apr. 27, 2019, 6 pages, <https://web.archive.org/web/20190519130630/http://www.forbes.com/>.

Imbault et al., "The green blockchain Managing decentralized energy production and consumption", IEEE, Milano, Italy, Jun. 2017, © 2017 IEEE, 6 pages.

LO3 Energy, "Reshaping the Energy Future", LO3 Energy, Accessed Oct. 1, 2019, 4 pages, <https://lo3energy.com/>.

McKay, R., "Alectra Utilities is powering a renewable energy breakthrough", IBM, Feb. 14, 2019, 5 pages, <https://www.ibm.com/blogs/industries/alectra-utilities-is-powering-a-renewable-energy-breakthrough/>.

Mearian, L., "Now, blockchain can turn carbon credits into tokens for trading", Computer World, May 31, 2018, 7 pages, <https://www.computerworld.com/article/3277207/now-blockchain-can-turn-carbon-credits-into-tokens-for-trading.html>.

Orsini et al., "Transactive Energy", EXERGY an LO3 Energy innovation, Jan. 25, 2019, Rev. 2, 46 pages, <https://exergy.energy/wp-content/uploads/2019/03/TransactiveEnergy-PolicyPaper-v2-2.pdf>.

Physics Forums, "Power consumed during Battery charging", Posted on Physics Forums, by Swatish, Jan. 24, 2012, 6 pages, <https://www.physicsforums.com/threads/power-consumed-during-battery-charging.570315/>.

Power Ledger, "Energy, reimagined", Power Ledger, Accessed Oct. 1, 2019, 4 pages, <https://powerledger.io/>.

PWC, "Blockchain—an opportunity for energy producers and consumers?", PwC Global FinTech Report, Mar. 2016, 16 pages, <https://www.pwc.fr/fr/assets/files/pdf/2016/12/blockchain_opportunity_for_energy_producers_and_consumers.pdf>.

Schiller, B., "How Blockchain Technology Could Decentralize The Energy Grid", Fast Company, Jul. 28, 2016, 12 pages, <https://www.fastcompany.com/3058380/how-blockchain-technology-could-decentralize-the-energy-grid>.

Varrucciu, M., "Blockchain and Electricity", Fintastico, Sep. 5, 2017, 11 pages, <https://www.fintastico.com/blog/blockchain-and-electricity/>.

Wikipedia, "Broadband Over Power Lines", From Wikipedia, the free encyclopedia, last edited on Sep. 29, 2019, <https://en.wikipedia.org/wiki/Broadband_over_power_lines >.

* cited by examiner

TARGETING ENERGY UNITS IN A BLOCKCHAIN

BACKGROUND OF THE INVENTION

The present invention relates generally to the field of power metering, and more particularly to blockchain based tracking of power production and consumption.

Power metering is the act of tracking power usage for a particular device or household. Power distribution systems, or grids, provide the power and include (i) generators, for producing power, (ii) substations and other power conditioning devices to transmit the power to consumers, and (iii) consumers or end point devices that use the power provided by the power distribution system. Typically, a meter or other power usage monitoring device provides a reading of the amount of power consumed.

A blockchain is a list of transactions or entries that are combined into blocks. A cryptographic hash value for each block is determined. Additionally, a hash value of the preceding block of transactions is also included. This recurring operation of cryptographic hashing of each block creates a data structure that cannot be retroactively altered without changing all of the subsequent blocks in the chain. As such, blockchains are often referred to as immutable or unchangeable, since without an adjustment to each subsequent block in the blockchain, any attempt to change even a single entry in the block will alter the hash values and fail verification.

SUMMARY

Embodiments of the present invention provide a method, system, and program product to track and target particular energy sources in an electrical grid. A processor stores information regarding units of produced energy as transactions in a blockchain. A processor receives, from an endpoint device of a plurality of endpoint devices connected to a power grid, a request for a unit of energy represented in the blockchain. A processor sends an indication, to the endpoint device, that the endpoint device is permitted to consume the unit of energy from the power grid. A processor updates the blockchain to record the consumption of the unit of energy.

DETAILED DESCRIPTION

Figure 1:
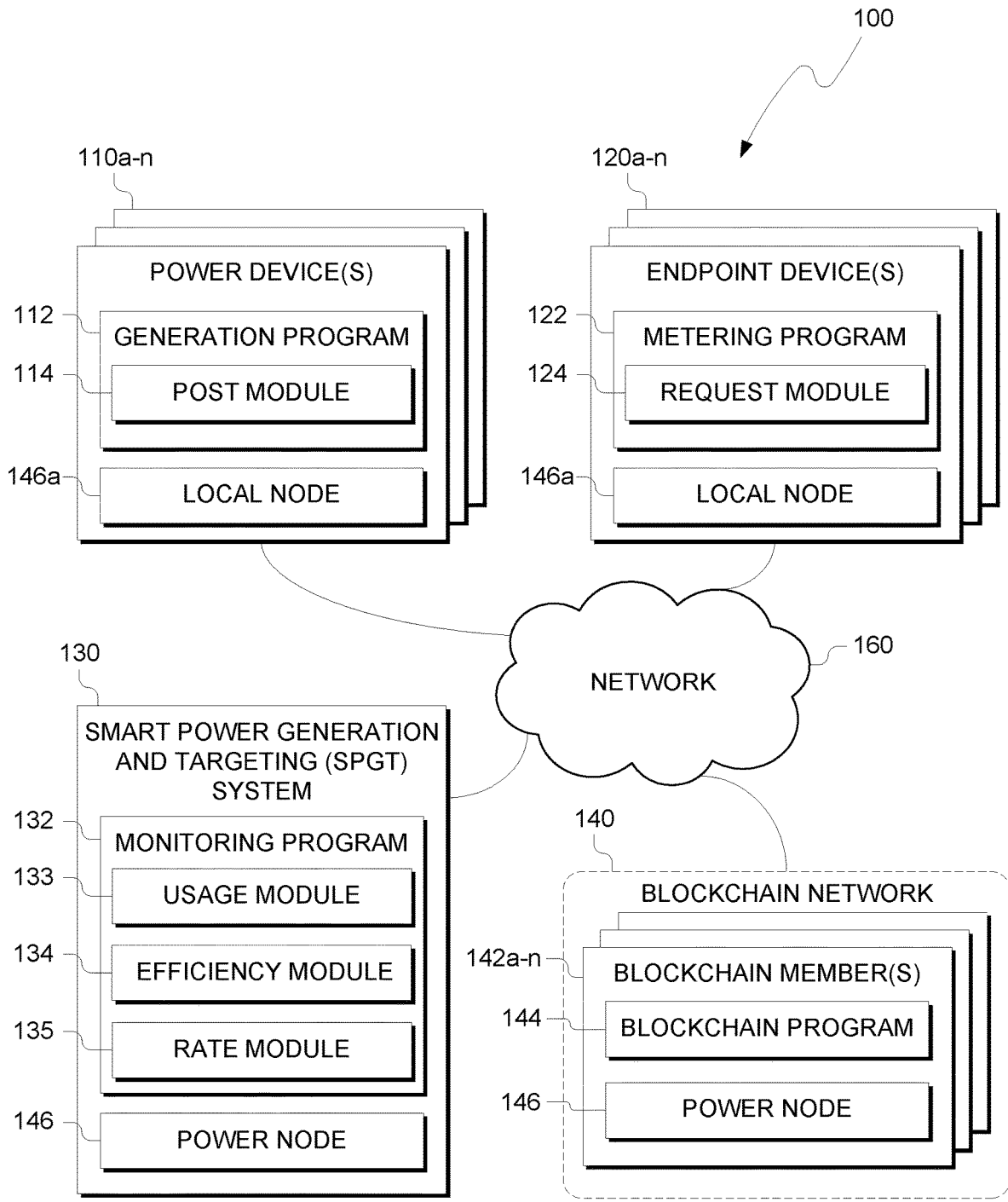
FIG. 1 is a functional block diagram illustrating a networked environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes power devices 110a-n, endpoint devices 120a-n, smart power generation and targeting (SPGT) system 130, and blockchain members 142a-n connected over network 160. Power devices 110a-n each include generation program 112, post module 114 and local node 146a. Endpoint devices 120a-n each include metering program 122, request module 124 and local node 146a. SPGT 130 includes monitoring program 132, usage module 133, efficiency module 134, rate module 135 and power node 146. Blockchain members 142a-n each include blockchain program 144 and power node 146.

In various embodiments of the present invention, power devices 110a-n, endpoint devices 120a-n, smart power generation and targeting (SPGT) system 130, and blockchain members 142a-n are each a computing device that can be a standalone device, a server, a laptop computer, a tablet computer, a netbook computer, a personal computer (PC), or a desktop computer. In another embodiment, power devices 110a-n, endpoint devices 120a-n, smart power generation and targeting (SPGT) system 130, or blockchain members 142a-n each represent a computing system utilizing clustered computers and components to act as a single pool of seamless resources. In general, power devices 110a-n, endpoint devices 120a-n, smart power generation and targeting (SPGT) system 130, and blockchain members 142a-n each can be any computing device or a combination of devices with access to power node 146 and local node 146a and is capable of executing generation program 112, metering program 122, monitoring program 132 and blockchain program 144. Power devices 110a-n, endpoint devices 120a-n, smart power generation and targeting (SPGT) system 130, and blockchain members 142a-n may include internal and external hardware components, as depicted and described in further detail with respect to FIG. 7.

In this exemplary embodiment, generation program 112 is stored on power devices 110a-n, metering program 122 is stored on endpoint devices 120a-n, monitoring program 132 is stored on SPGT system 130 and blockchain program 144 is stored on blockchain members 142a-n. However, in other embodiments, generation program 112, metering program 122, monitoring program 132 and blockchain program 144 may be stored externally and accessed through a communication network, such as network 160. Network 160 can be, for example, a local area network (LAN), a wide area network (WAN) such as the Internet, or a combination of the two, and may include wired, wireless, fiber optic or any other connection known in the art. In general, network 160 can be any combination of connections and protocols that will support communications between power devices 110a-n, endpoint devices 120a-n, smart power generation and targeting (SPGT) system 130, and blockchain members 142a-n, in accordance with a desired embodiment of the present invention.

In various embodiments, power devices 110a-n and endpoint devices 120a-n comprise various components and devices that may produce or consume power from an electric power grid. In some embodiments, power devices 110a-n are power generating devices such as generators of varying types (e.g., solar panels, wind turbines, steam turbines, etc.). In other embodiments, power devices 110a-n are communicatively coupled to, via network 160, various power generating devices and corresponding sensors that report various information regarding power generated by said power generating devices and corresponding sensors. Similarly, in some embodiments, endpoint devices 120a-n are power consuming devices that require power from the electric power grid to operate. In other embodiments, endpoint devices 120a-n are communicatively coupled to, via network 160, various power consuming devices and corresponding sensors that report various information regarding power consumed by said power consuming devices and corresponding sensors. In further embodiments, a device can be both a device from endpoint devices 120a-n and a device from power devices 110a-n. For example, a household may have solar panels installed and contribute power to a power grid (i.e., as a power device from power devices 110a-n) while also consuming power when the solar panels are not active (i.e., as an endpoint device of endpoint devices 120a-n). One of ordinary skill in the are will appreciate that power devices 110a-n and endpoint devices 120a-n may be the same device (e.g., a smart home controller that is communicatively coupled to both a power generator and a power distributor) or attributed to the same location without deviating from the invention.

In various embodiments, power devices 110a-n include a respective generation program 112 for collecting information regarding power being generated by the corresponding power device, or devices, associated with power devices 110a-n. Based on the collected information regarding the power generated by the corresponding power device or devices, post module 114 of generation program 112 sends the information to blockchain network 140 for entry of energy produced into the blockchain ledger of power node 146. Power node 146 has a copy of a blockchain ledger comprising various transactions of power generated by power devices 110a-n that is maintained by blockchain network 140. In some embodiments and scenarios, generation program 112 posts or requests that an entry be made regarding power generated directly to blockchain network 140, as described in further detail regarding FIG. 4. In other embodiments, generation program 112 sends the request to monitoring program 132 of smart power generation and targeting (SPGT) system 130, which in turn posts the entry to be entered into the blockchain ledger via power node 146 maintained by blockchain network 140.

In various embodiments, generation program 112 posts to power node 146 of blockchain network 140 information regarding power being generated by the corresponding power device, or devices, associated with power devices 110a-n. Blockchain network 140 includes various blockchain members 142a-n. Power node 146 contains a data structure that is shared among blockchain members 142a-n. For example, the blocks of the blockchain ledger are a listing of various entries regarding power generated previously by power devices 110a-n. Each blockchain member of blockchain members 142a-n includes an instance of blockchain program 144. When a request to post power information is received, each instance of blockchain program 144 of the blockchain members 142a-n process the request to post the power information to the blockchain. Once a majority of the blockchain programs of the blockchain members 142a-n reach a consensus, power information is added the blockchain ledger. For example, consensus is reached based on a consensus protocol such as the Practical Byzantine Fault Tolerance (PBFT) consensus model. One of ordinary skill in the art will appreciate that any methodology or model for determining consensus among blockchain members 142a-n may be used without deviating from the invention.

In various embodiments and scenarios, blockchain network 140 stores the posted power generation information in an ordered list stored as a block of power node 146. As one of ordinary skill in the art will appreciate, blockchains possess many important qualities. For each item or entry added to power node 146, the blockchain program 144 that reached consensus among blockchain members 142a-n solve or generate cryptographic hash values that not only satisfy the current entry's information, but also the previous entries or blocks in the ledger of power node 146. Any attempt to change the entries would result in different hash values which would cascade or further alter any subsequent entries. As such, blockchains possess a property referred to as immutability, an ability that does not allow changes to consensus entries made by the blockchain members 142a-n, which provides traceability and accountability for transactions recorded by the blockchain.

In various embodiments, metering program 122 of an endpoint device of endpoint devices 120a-n identifies power usage request for one or more devices that consume power. Based on criteria regarding the sourcing of said requested power, request module 124 of metering program 122 identifies entries in the ledger on node power node 146 or local node 146a for power generated by power devices 110a-n that match the criteria. For example, metering program 122 has identified that an associated endpoint device has criteria to source power from power devices 110a-n that produce electricity from solar cells. In this example, request module 124 identifies entries in the ledger contained by local node 146a that have been indicated to be generated from solar sources. Upon identification of a power generated entry in the blockchain ledger that matches the criteria, request module 124 of metering program 122 posts an entry of energy consumed on the ledger indicating the usage of the power. One of ordinary skill in the art of power distribution will recognize that the actual power generated from power devices 110a-n is not directly delivered or routed to endpoint devices 120a-n. However, as discussed herein smart power generating and targeting (SPGT) system 130 monitors and tracks entries in the blockchain to attribute and provide reporting of such usage.

In some embodiments, metering program 122 is provided, by a user, one or more rules regarding how energy and power is to be sourced or attributed to when indicated by the entries in the ledge of power node 146. For example, one rule indicates that power is preferred to be sourced from renewable sources. In other examples, a preferred rate for energy consumption may be in a user-configured rule. In another example, a user-configured rule may indicate a geo-fence or nearby area to source energy from. During long distance transmission, power loss may occur, leading to inefficiencies during power delivery. One of ordinary skill in the art will appreciate that any number and type of rules may be provided by a user to source energy and attribute usage to certain power devices 110a-n based on a variety of user preferences, without deviating from the invention.

In various embodiments, monitoring program 132 of SPGT system 130 tracks various entries on the blockchain and provides reports regarding power generated by power devices 110a-n and power used by endpoint devices 120a-n. Due to the immutability of blockchains, monitoring program 132 does not need to verify nor authorize power generation and consumption by participating devices upon consensus of blockchain network 140. However, in some embodiments, monitoring program 132 of SPGT system 130 receives information from post module 114 of various power devices 110a-n and from request module 124 of endpoint devices 120*a-n* regarding various entries to the blockchain ledger. Previous discussions and embodiments, where any device can post to a blockchain, are referred to as permissionless or public blockchains. In other embodiments, such as where monitoring program 132 of SPGT system 130 receives request to post to power node 146, such configurations are referred to as permissioned or private blockchains. One of ordinary skill in the art will recognize that either public or private blockchains may be utilized without deviating from the invention.

In various embodiments, usage module 133 of monitoring program 132 generates reports regarding various fulfilled requests for sourcing power to endpoint devices 120*a-n*. In some scenarios, usage reports generated by usage module 133 are provided to one or more operators of power devices 110*a-n* regarding the amount of power, type of power requested and other metrics regarding the usage of power among endpoint devices 120*a-n*. In various embodiments, usage module 133 of monitoring program 132 generates reports regarding that ability of one or more power devices 110*a-n* to fulfill or meet various request from endpoint devices 120*a-n* based on source of power as well as any other criteria endpoint devices 120*a-n*. Such reports provide participating power devices 110*a-n* to analyze fulfillment metrics and determine trends as well as unmet demands made by endpoint devices 120*a-n*. In various embodiments, rate module 135 of monitoring program 132 generates reports regarding the rates and amounts of usage various endpoint devices 120*a-n* have indicated as being utilized when posting usage information to power node 146. In some embodiments and scenarios, monitoring program 132 generates billing reports and statement that may be used for collections by operators of power devices 110*a-n*.

In various embodiments, power node 146 is replicated and shared across multiple devices (i.e., power devices 110*a-n*, endpoint devices 120*a-n* and SPGT 130). In some scenarios, the blockchain of local nodes 146*a* may be permissioned or otherwise restrict access to entries in the blockchain ledger of power node 146. Additionally, some device, such as power devices 110*a-n* and endpoint devices 120*a-n*, may have limited memory and storage characteristics. In such scenarios, local node 146*a* may be stored locally on such devices. While FIG. 1 depicts power devices 110*a-n*, endpoint devices 120*a-n* and SPGT 130 as not part of blockchain network 140, some embodiments may include any one of, or subset thereof, power devices 110*a-n*, endpoint devices 120*a-n* and SPGT 130 as part of blockchain network 140. For example, in a public, permissionless blockchain network any device from power devices 110*a-n* or endpoint devices 120*a-n* may participate as a blockchain member of blockchain network 140 that contributes to the act of consensus for the addition of entries to the ledger of power node 146. Additionally, in both permissioned and permissionless blockchains SPGT 130 may participate as a blockchain member of blockchain network 140 that contributes to the act of consensus for the addition of entries to a node. One of ordinary skill in the art will appreciate that any configuration of participating blockchain members 142*a-n* the comprises any combination of power devices 110*a-n*, endpoint devices 120*a-n* and SPGT 130 may be utilized without deviating from the invention.

Figure 2:
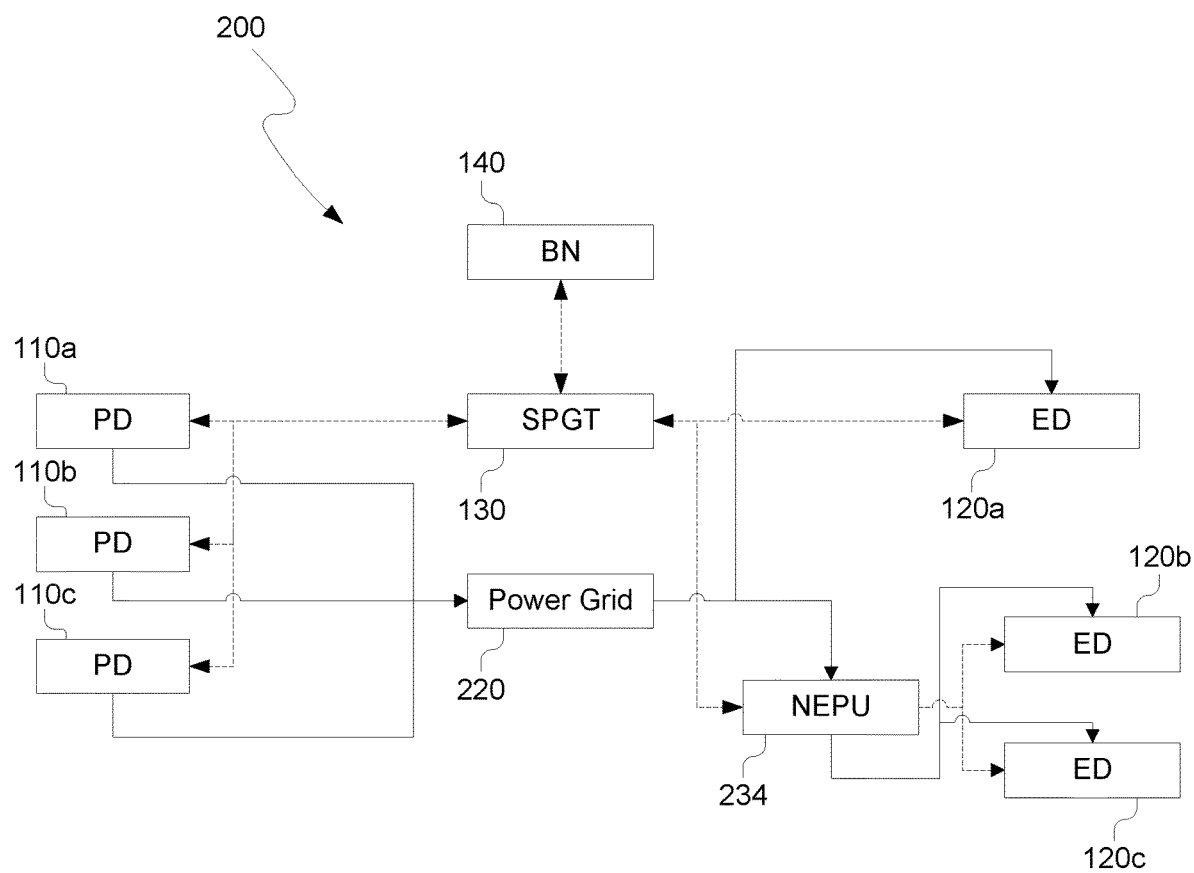
FIG. 2 is a functional block diagram illustrating a power transmission network with power and data communication paths.

FIG. 2 is a functional block diagram illustrating a power transmission network, generally designated as 200, with power delivery paths and data communication paths. FIG. 2 includes SPGT 130 and blockchain network 140, power devices (PD) 110*a-c*, power grid 220, endpoint devices (ED) 120*a-c* and network-enabled power unit (NEPU) 234. The power delivery paths are indicated as solid connecting lines and the data communication paths are indicated as dashed lines.

Power devices 110*a-c* are power generating devices that provide power to power grid 220. Power grid 220 is a power distribution system that provides power to endpoint devices (ED) 120*a-c*. One of ordinary skill in the art will appreciate that power grid 220 may be of any size and complexity without deviating from the invention. For example, power grid 220 may be a national or large-scale power distribution system. As another example, power grid 220 may be a smaller city or community-based power distribution system, such as a microgrid. In various embodiments, power grid 220 may be any power distribution system that transports and conditions electrical power for delivery to endpoint devices (ED) 120*a-c*.

In various embodiments, power devices (PD) 110*a-c* generate electricity for delivery by power grid 220. As discussed herein, when power devices (PD) 110*a-c* generate electricity, the corresponding generation program 112 posts information regarding the power generated to blockchain network 140. Depending on the configuration of power node 146 and blockchain network 140, the corresponding generation program 112 may directly send the information regarding the power generated to power node 146 or blockchain network 140 or the information may be sent to SPGT 130, which posts the information to blockchain network 140. In either scenario, blockchain network 140 reaches consensus and enters the information the blockchain ledger.

In various embodiments, the ledger of power node 146 includes information indicating one of more of (i) the amount of power generated, (ii) the manner in which the power was generated (e.g., solar, wind, coal, and the like) and (iii) a rate or monetary amount for usage of the power as entries or blocks in the ledger of power node 146. In some embodiments, power node 146 includes entries with information regarding the power generated by power devices (PD) 110*a-c* as smart contracts, as depicted and described in further detail with respect to FIG. 3.

In some embodiments, power devices (PD) 110*a-c* includes various power granting devices utilized by utilities or organization to supply power to power grid 220. In some embodiments and scenarios, devices from both endpoint devices (ED) 120*a-c* and from power devices (PD) 110*a-c* may be associated with the same location, and some instances, may be the same computing device. For example, a household with solar panels may, at times, provide power to power grid 220 and then at other times request power from power grid 220. As discussed herein, endpoint devices (ED) 120*a-c* and power devices (PD) 110*a-c* may be discussed as separate entities in various scenarios and examples. One of ordinary skill in the art will appreciate that such discussion is provided for illustrative purposes and that the various embodiments discussed herein may also include embodiments where endpoint devices (ED) 120*a-c* and power devices (PD) 110*a-c* may be the same computing device or may be located at the same location or endpoint for power consumption, as well as power generation.

In various embodiments, endpoint devices (ED) 120*a-c* are network-enabled devices that consume power, such as a smart or network enabled device that regulates power (e.g., a smart plug), or distributes power to other devices via local power delivery paths, such as a breaker box for home power distribution (i.e., network-enabled power unit (NEPU) 234). In various scenarios, endpoint devices 120*a-c*, or NEPU 234, identify a request for power from power consuming devices connected to endpoint devices 120*a-c* or NEPU 234.

In some scenarios, a request may be received as a packet of information sent locally, where the power consuming device is network-enabled. In other scenarios, based on a load or current draw being applied to the endpoint devices 120a-c or NEPU 234, the endpoint devices 120a-c or NEPU 234 identify a request for power, with the amount of power identified based on known or historic usage parameters of connected devices. As discussed herein, endpoint devices 120a-c or NEPU 234 request power based on criteria associated with the connected devices and preferences of a user or administrator of the location or devices. The endpoint devices 120a-c or NEPU 234 send the request to SPGT 130. Based on the criteria, SPGT 130 identifies an entry in the ledger on power node 146 that matches the request, marks the power for the entry to be used, fully of partially, and sends an indication to the requesting endpoint devices 120a-c or NEPU 234 of the fulfillment, at which point the endpoint devices 120a-c or NEPU 234 draws power from power grid 220 commensurate to request.

In some scenarios and embodiments, one or more data communication paths are utilized to provide communication between power devices (PD) 110a-c, endpoint devices (ED) 120a-c, NEPU 234, SPGT 130, and blockchain network 140 regarding the various embodiments discussed in FIG. 1. For example, a wireless data communication path may be utilized between NEPU 234 and endpoint devices (ED) 120b-c. However, in some embodiments and scenarios, both the data communication paths and power delivery paths depicted in FIG. 2 share the same medium. In some scenarios, the data communication path utilized between NEPU 234 and endpoint devices (ED) 120b-c is the power delivery paths. For example, NEPU 234 and endpoint devices (ED) 120b-c communicate via the power lines utilized in power delivery through such protocols or standards such as Broadband over Power Lines (BPL) or power-line communication (PLC) protocol that can utilize the power delivery paths for power distribution as well as the communication paths.

Figure 3:
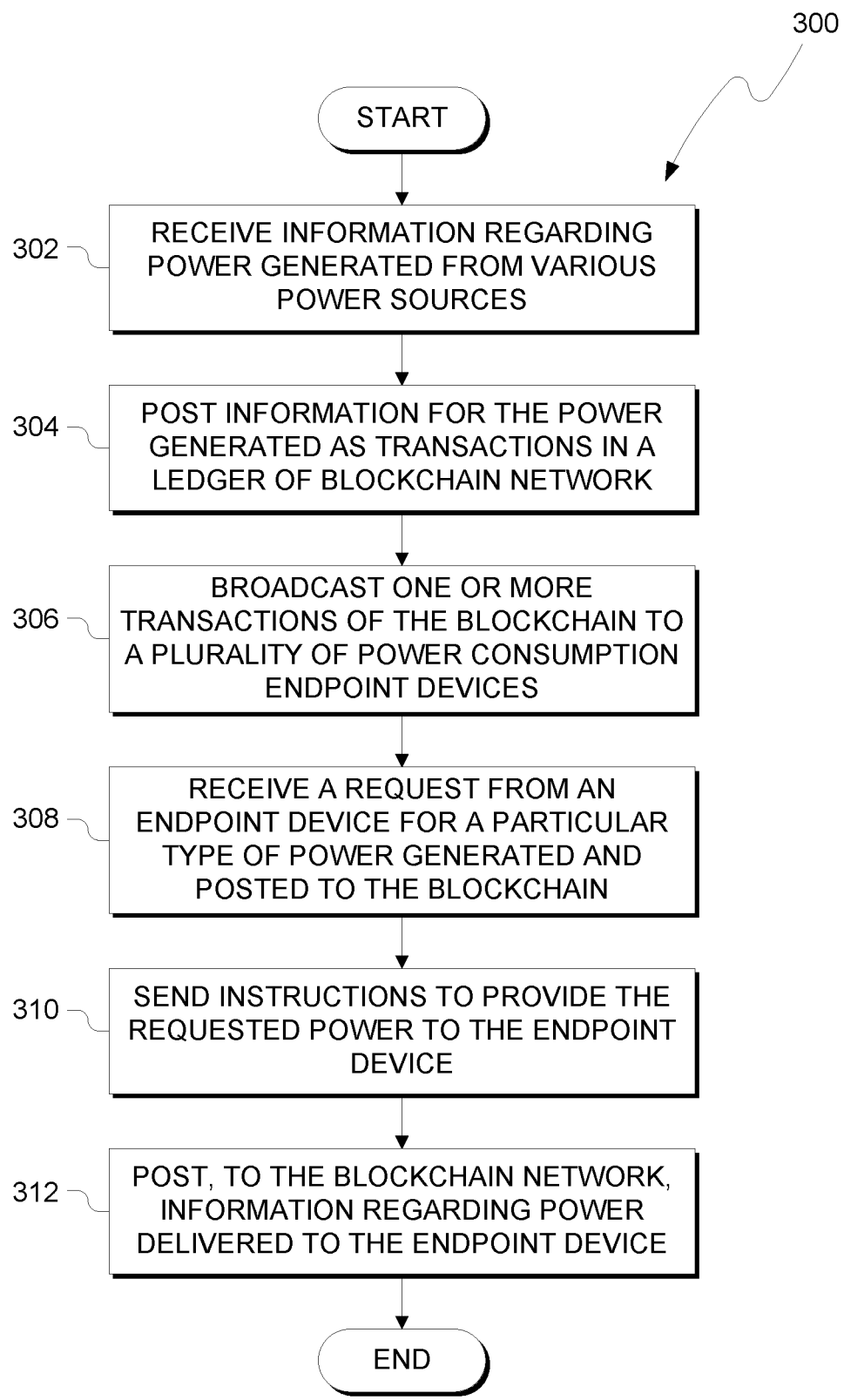
FIG. 3 illustrates operational processes of a monitoring program on a computing device within the environment of FIG. 1, in accordance with an exemplary embodiment of the present invention.

FIG. 3 illustrates operational processes, generally designated as 300 of monitoring program 132. In the following, SPGT 130 is indicated as the origination of posting entries on the ledger to power node 146 (i.e., processes 304 and 312). As discussed herein, some scenarios and embodiments of the invention provide that other devices depicted in FIG. 1 may post to blockchain network 140. In process 302, monitoring program 132 receives information regarding the power generated by a power device of power devices 110a-n. Either during operation or at predetermined intervals, generation program 112 of the power device sends information regarding the power generated by the power device to monitoring program 132. Example information regarding the power generated by the power device includes, but is not limited to, (i) an amount of energy generated, or portion thereof; (ii) a source or type of generator used in power generation; and (iii) a rate or cost to utilize the power generated by the power device.

In process 304, monitoring program 132 posts the information regarding the power generated by the power device to the blockchain network 140. In some scenarios, such as in a public blockchain, the power device may post the information regarding the power generated by the power device to the blockchain network 140. In various embodiments, blockchain members 142a-n add the entry to power node 146 after reaching consensus regarding the corresponding cryptographic hashes to maintain the properties of the ledger on power node 146 (e.g., such that immutability of the blockchain is maintained). In process 306, monitoring program 132 broadcasts one or more blocks of the blockchain to the power consuming endpoint devices 120a-n. In some scenarios, monitoring program 132 sends new transaction to be posted to power node 146. In other scenarios, monitoring program 132 sends transaction in grouping at predetermined intervals (e.g., after a pre-determined interval of time or after a predetermined number of blocks have been posted to power node 146). In various embodiments, both power devices 110a-n and endpoint devices 120a-n store a copy of the broadcasted block to a local node 146a.

In process 308, monitoring program 132 receives a request from an endpoint device of endpoint devices 120a-n that request a particular energy entry in power node 146. In some embodiments and scenarios, endpoint devices 120a-n maintain a copy of the ledger on local node 146a. In such scenarios, metering program 122 of the requesting endpoint device identifies an entry on the ledger that matches one or more criteria. Once found, metering program 122 sends identifying information for the endpoint device, to monitoring program 132. In other embodiments and scenarios, metering program 122 sends the one or more criteria for power selection to monitoring program 132. In such embodiments and scenarios, monitoring program 132 identifies a block or entry of energy produced that matches the one or more criteria.

In process 310, monitoring program 132 sends instructions to the requesting endpoint device indicating that the request is fulfilled. Based on the matched or identified entry in the ledger on the blockchain, the instructions will indicate the endpoint devices allotted energy or time to access power from power grid 220. In process 312, monitoring program 132 posts to blockchain network 140 a new entry indicating the previous entry has been utilized and no longer offered, attributing the unit of power to be "consumed" by the endpoint device. For example, the new entry may include an address of the available energy indicated in process 304, binding the two entries for later usage reporting as discussed herein.

Figure 4:
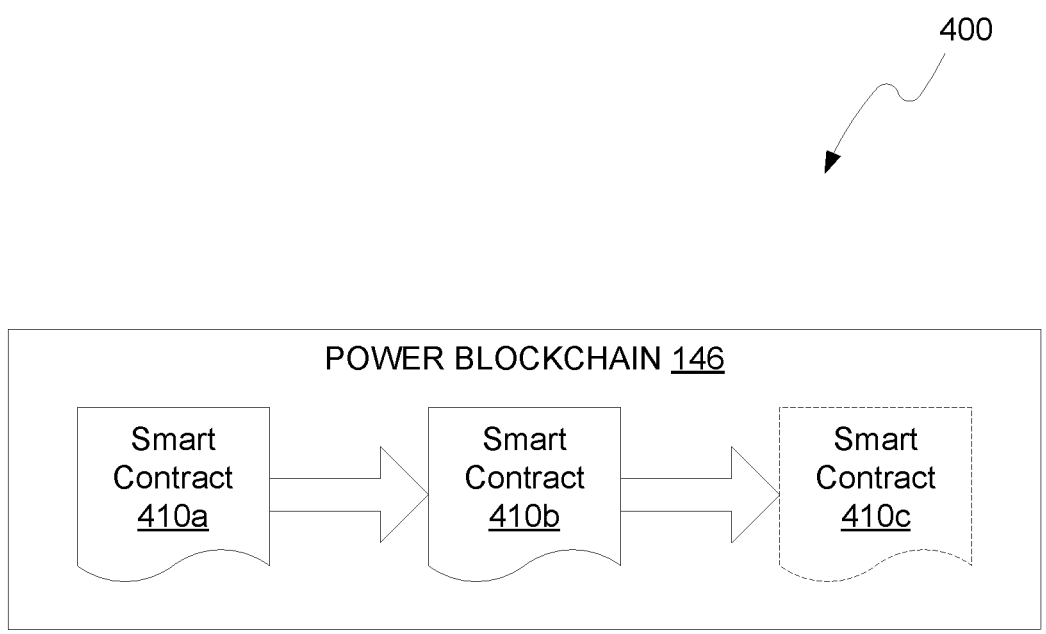
FIG. 4 depicts a block diagram illustrating a blockchain comprising smart contracts.

FIG. 4 depicts a block diagram, generally designated as 400, illustrating power node 146 comprising smart contracts 410a-c. As discussed herein, blockchains are a series of entries in a ledger that are cryptographically dependent on the preceding entry. In some embodiments, each entry includes an address along with information regarding power generated, for posts by power devices 110a-n, or power consumed, for posts from endpoint devices 120a-n. FIG. 4 includes embodiments where in addition to such information, each entry is presented as a smart contract. Smart contracts are a particular feature of blockchain that also include conditions, requirements and instructions for the entry to be used or utilized. In some embodiments, the entries power node 146 contain smart contracts 410a-c that include various requirements and instructions for accepting the entry for power delivery or sourcing. For example, given a known power delivery standard (e.g., 120V at 60 Hz.) and current draw of the endpoint device, the instructions include an active time the endpoint may draw power from power grid 220 such that the amount of energy consumed matches that which was associated with the blockchain entry. Additionally, smart contracts 410a-c include one or more conditions for negotiating the requirements to fulfill and entry, such as a range of acceptable rates. In some embodiments and scenarios, users of endpoint devices 120a-n may request a unit of energy from the blockchain with an offered price or rate. In this example, smart contracts 410a-c include acceptable rates that operators of power devices 110a-n are willing to accept.

Figure 5:
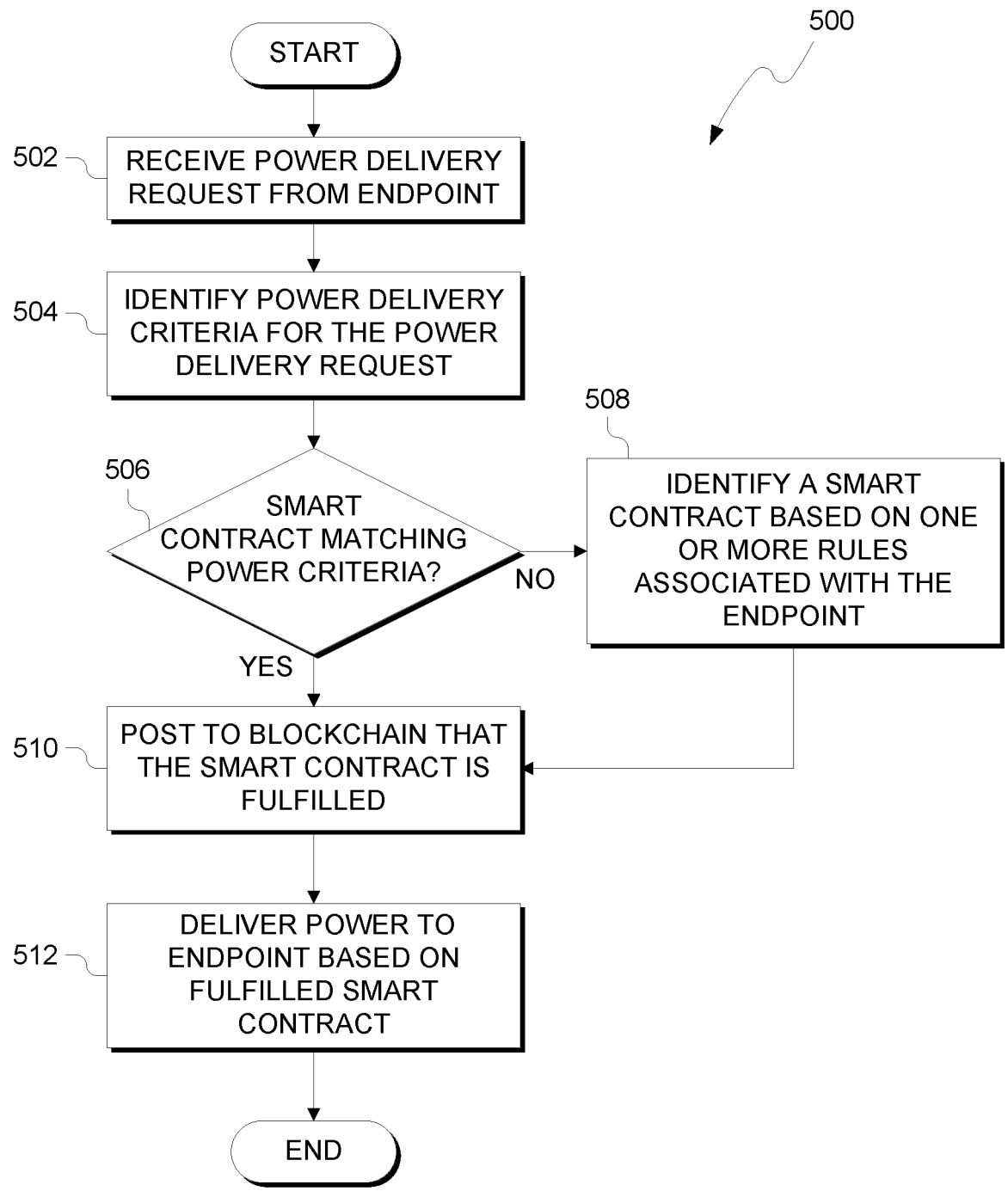
FIG. 5 illustrates operational processes of a metering program on a computing device within the environment of FIG. 1, in accordance with an exemplary embodiment of the present invention.

FIG. 5 illustrates operational processes, generally designated 500, of metering program 122. In process 502, metering program 122 receives a power delivery request from a connected endpoint device. In some embodiments and scenarios, the endpoint device is network-enabled and communicates to metering program 122 over a data communication path. In other scenarios, metering program 122 detects a load or current draw from the connected device to indicate a power delivery request. In process 504, metering program 122 identifies power delivery criteria associated with the received power delivery request. In some embodiments, a user provides metering program 122 with one or more preferred criteria for power sourcing and delivery such as (i) the type of generator used or energy used to generate electrical power (e.g., solar cells, coal-burning, wind turbines, natural gas, geothermal, or nuclear reactor), (ii) a preferred rate or cost to be incurred for sourcing electrical power from a providing power device, and (iii) an amount to be used during delivery of the power to the endpoint device.

In decision process 506, metering program 122 identifies a matching entry in the ledger on power node 146. In some embodiments, metering program 122 utilizes local node 146a in process 506. If a matching power entry on the blockchain is identified (YES branch of process 506), then metering program 122 post to power node 146 that the associated smart contract is to be fulfilled. In scenarios where blockchain network 140 is permissioned, metering program 122 sends a request to monitoring program 132 of SPGT 130, which in turn posts the indication that the smart contract will be fulfilled to power node 146. If no match can be identified (NO Branch of process 506), then metering program 122 identifies a matching smart contract based on one or more rules associated with the endpoint. For example, metering program 122 includes user provided rules for a hierarchical preference from which power may be sourced. For example, metering program 122 first attempts to find smart contracts that originate from renewable energy sources, then proceeds to non-renewable sources if no match is found. Another example includes rules for acceptable rates by the user of the endpoint device such as a range of values for rates. Additionally, metering program 122 may include rules for endpoints indicating the criticality of the operation of the device. If a device is marked as critical for operation, then metering program 122 will always identify a smart contract to fulfil the power delivery request in process 502. If a device is marked as non-critical, then metering program 122 may not find an alternative smart contract if none that match either the criteria or rules for the endpoint device. In process 512, upon identification and posting to power node 146 of a fulfilled smart contract, metering program 122 delivers power to the endpoint device based on the terms of the fulfilled smart contract. For example, where the smart contract has a pre-determined amount of energy, metering program 122 monitors the power drawn by the device until the total amount of energy is used.

In some embodiments for process 502, metering program 122 determines an amount of power needed based on a device requesting power. The device requesting power is a smart-enabled device that, based on received commands from the user, identifies an amount of power that is necessary to perform the received commands. For example, a user instructs a smart oven to operate for 30 minutes at 350° F. Based on the operational characteristics of the oven, an expected amount of energy to be consumed is identified. In such embodiments, metering program 122 determines an amount of power needed based on the request and includes in decision process 506 the expected energy needed in the criteria and request for souring energy in the blockchain nodes.

Figure 6:
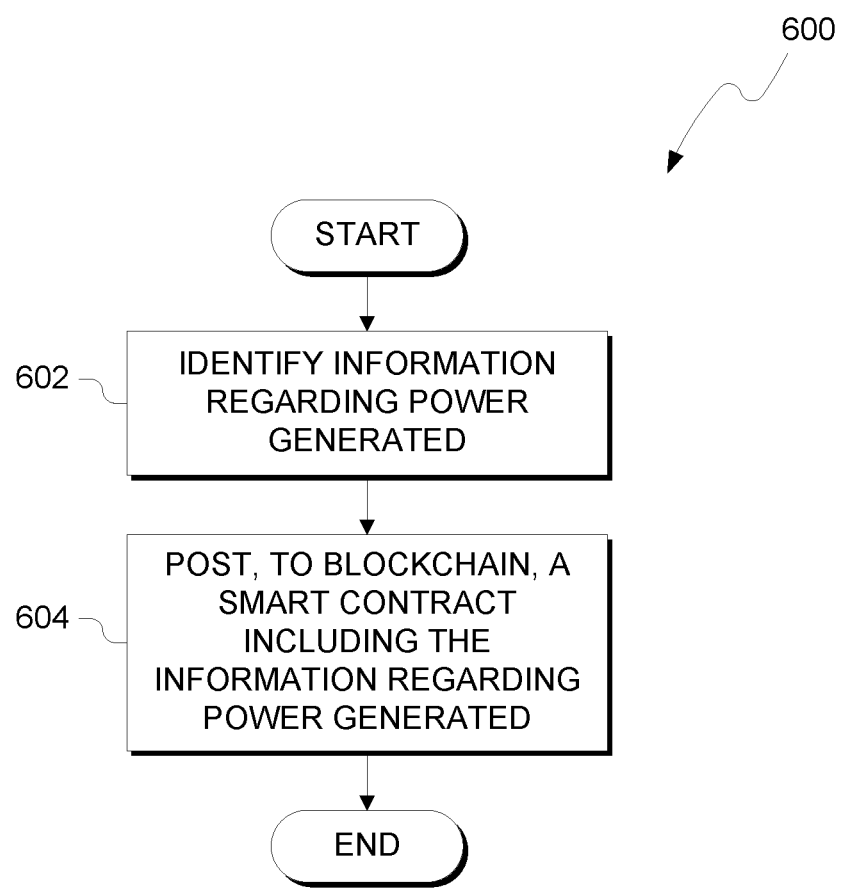
FIG. 6 illustrates operational processes of a generation program on a computing device within the environment of FIG. 1, in accordance with an exemplary embodiment of the present invention.

FIG. 6 illustrates operational processes, generally designated 600, of generation program 112. In process 602, generation program 112 identifies information power regarding that is generated and supplied to power grid 220. For example, sensors such as internet of things (IoT) devices connected to a line or connection between the power generating device of power devices 110a-n and power grid 220 record the amount of power generated by the device. Additionally, the information regarding manner in which the power was generated (e.g., solar, wind, coal, and the like) and a rate or monetary amount for usage of the power are also collected. In process 604, generation program 112 post to power node 146 a smart contract including the gathered information regarding the power generated. In some embodiments and scenarios, generation program 112 posts to power node 146 at regular intervals. In other embodiments, generation program 112 posts to power node 146 based on denominations of energy (e.g., for a uniform denomination, each contract is for 1 kWh of energy, or varied denominations, various contracts in denominations of 1 kWh, 2 kWh and 5 kWh). One of ordinary skill in the art will appreciate that process 604 may be done continuously over the operation of the power generating device of power devices 110a-n or at set intervals or times without deviating from the invention.

Figure 7:
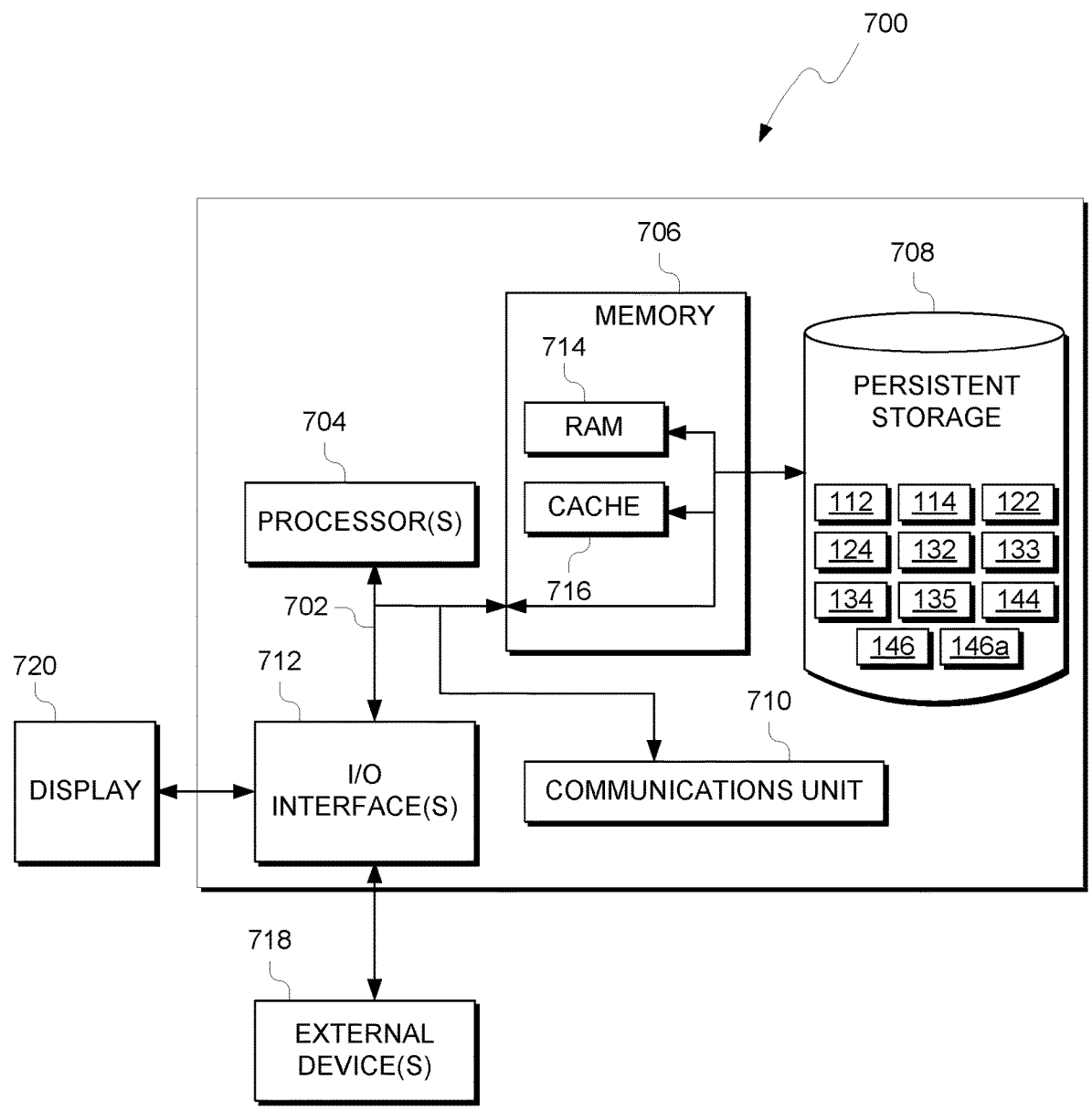
FIG. 7 depicts a block diagram of components of the computing device executing a monitoring program, a metering program or a generation program, in accordance with an exemplary embodiment of the present invention.

FIG. 7 depicts a block diagram, 700, of components of power devices 110a-n, endpoint devices 120a-n, smart power generation and targeting (SPGT) system 130, and blockchain members 142a-n, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Power devices 110a-n, endpoint devices 120a-n, smart power generation and targeting (SPGT) system 130, and blockchain members 142a-n each include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Generation program 112, metering program 122, monitoring program 132 and blockchain program 144 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 160. In these examples, communications unit 710 includes one or more network interface cards. Communications unit 710 may provide communications through the use of either or both physical and wireless communications links. Generation program 112, metering program 122, monitoring program 132 and blockchain program 144 may be downloaded to persistent storage 708 through communications unit 710.

I/O interface(s) 712 allows for input and output of data with other devices that may be connected to power devices 110a-n, endpoint devices 120a-n, smart power generation and targeting (SPGT) system 130, or blockchain members 142a-n. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., generation program 112, metering program 122, monitoring program 132 and blockchain program 144, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
storing information regarding units of produced energy as transactions in a blockchain;
receiving, from an endpoint device of a plurality of endpoint devices connected to a power grid, a request for a unit of energy represented in the blockchain, wherein the request includes a type of generator used in generation of the unit of energy;
in response to a determination that an energy produced entry in the blockchain matches the request for the unit of energy, sending an indication, to the endpoint device, that the endpoint device is permitted to consume the unit of energy from the power grid; and
updating the blockchain to record the consumption of the unit of energy.

2. The method of claim 1, wherein the type of generator used in generation of the unit of energy includes at least one or the following: solar cell, coal-burning, wind turbine, natural gas, geothermal, or nuclear reactor.

3. The method of claim 1, wherein the request indicates a preferred rate for the unit of energy.

4. The method of claim 1, wherein updating the blockchain to record the consumption of the unit of energy further comprises:
posting an energy consumed entry in the blockchain indicating the matching energy produced entry in the blockchain that matches the request for the unit of energy has been consumed.

5. The method of claim 1, wherein updating the blockchain to record the consumption of the unit of energy further comprises:
identifying a smart contract associated with the unit of energy represented in the blockchain; and
performing one or more instructions associated with the smart contract.

6. The method of claim 1, the method further comprising:
identifying the blockchain does not include an entry that matches the request for the unit of energy; and
identifying a second entry in the blockchain to attribute for fulfillment of the request based, at least in part, on one or more rules.

7. The method of claim 1, wherein the request is transmitted via wiring of the power grid.

8. A computer program product comprising:
one or more computer-readable storage media and program instructions stored on the one or more computer-readable storage media, the program instructions comprising:
program instructions to store information regarding units of produced energy as transactions in a blockchain;
program instructions to receive, from an endpoint device of a plurality of endpoint devices connected to a power grid, a request for a unit of energy represented in the blockchain, wherein the request includes a type of generator used in generation of the unit of energy;
in response to a determination that an energy produced entry in the blockchain matches the request for the unit of energy, program instructions to send an indication, to the endpoint device, that the endpoint device is permitted to consume the unit of energy from the power grid; and
program instructions to update the blockchain to record the consumption of the unit of energy.

9. The computer program product of claim 8, wherein the type of generator used in generation of the unit of energy includes at least one or the following: solar cell, coal-burning, wind turbine, natural gas, geothermal, or nuclear reactor.

10. The computer program product of claim 8, wherein the request indicates a preferred rate for the unit of energy.

11. The computer program product of claim 8, wherein program instructions to update the blockchain to record the consumption of the unit of energy further comprises:
program instructions to post an energy consumed entry in the blockchain indicating the matching energy produced entry in the blockchain that matches the request for the unit of energy has been consumed.

12. The computer program product of claim 8, wherein program instructions to update the blockchain to record the consumption of the unit of energy further comprises:
program instructions to identify a smart contract associated with the unit of energy represented in the blockchain; and program instructions to perform one or more instructions associated with the smart contract.

13. The computer program product of claim 8, the program instructions further comprising:
    program instructions to identify the blockchain does not include an entry that matches the request for the unit of energy; and
    program instructions to identify a second entry in the blockchain to attribute for fulfillment of the request based, at least in part, on one or more rules.

14. The computer program product of claim 8, wherein the request is transmitted via wiring of the power grid.

15. A computer system comprising:
    one or more computer processors;
    one or more computer readable storage media; and
    program instructions stored on the computer readable storage media for execution by at least one of the one or more processors, the program instructions comprising:
        program instructions to store information regarding units of produced energy as transactions in a blockchain;
        program instructions to receive, from an endpoint device of a plurality of endpoint devices connected to a power grid, a request for a unit of energy represented in the blockchain, wherein the request includes a type of generator used in generation of the unit of energy;
        in response to a determination that an energy produced entry in the blockchain matches the request for the unit of energy, program instructions to send an indication, to the endpoint device, that the endpoint device is permitted to consume the unit of energy from the power grid; and
        program instructions to update the blockchain to record the consumption of the unit of energy.

16. The computer system of claim 15, wherein the type of generator used in generation of the unit of energy includes at least one or the following: solar cell, coal-burning, wind turbine, natural gas, geothermal, or nuclear reactor.

17. The computer system of claim 15, wherein the request indicates a preferred rate for the unit of energy.

18. The computer system of claim 15, wherein program instructions to update the blockchain to record the consumption of the unit of energy further comprises:
    program instructions to post an energy consumed entry in the blockchain indicating the matching energy produced entry in the blockchain that matches the request for the unit of energy has been consumed.

19. The computer system of claim 15, wherein program instructions to update the blockchain to record the consumption of the unit of energy further comprises:
    program instructions to identify a smart contract associated with the unit of energy represented in the blockchain; and
    program instructions to perform one or more instructions associated with the smart contract.

20. The computer system of claim 15, the program instructions further comprising:
    program instructions to identify the blockchain does not include an entry that matches the request for the unit of energy; and
    program instructions to identify a second entry in the blockchain to attribute for fulfillment of the request based, at least in part, on one or more rules.

21. The computer system of claim 15, wherein the request is transmitted via wiring of the power grid.

* * * * *